No. 832,560. PATENTED OCT. 2, 1906.
H. S. PULLMAN.
VEHICLE WHEEL.
APPLICATION FILED JAN. 8, 1906.
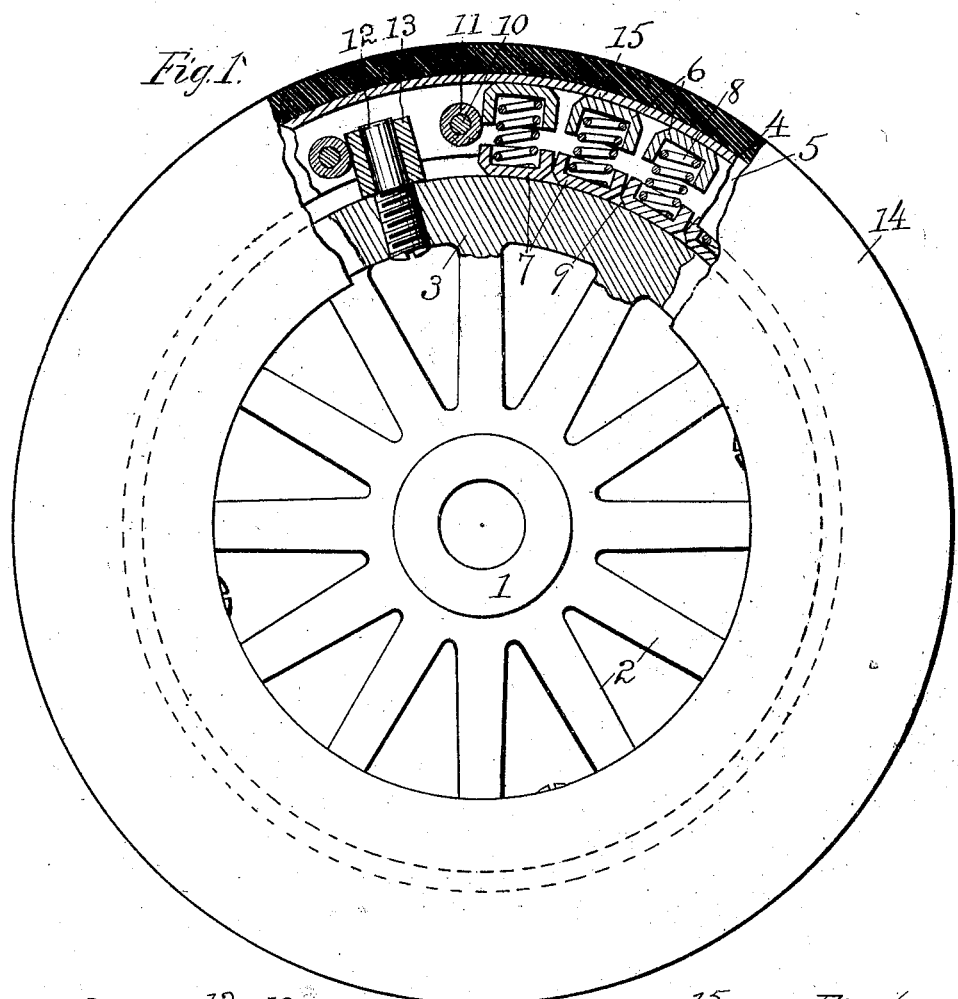
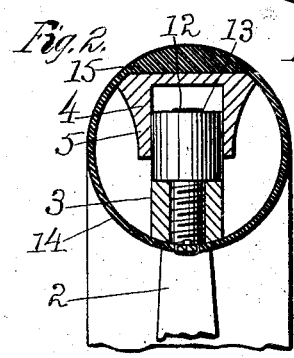 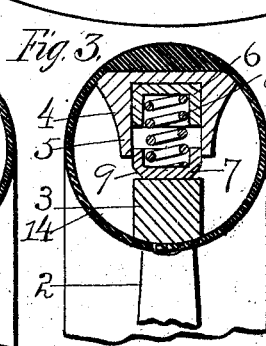 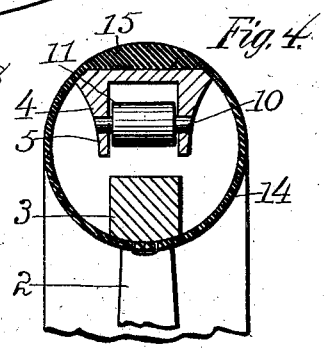
Witnesses:
Inventor.

UNITED STATES PATENT OFFICE.

HERBERT S. PULLMAN, OF MERIDEN, CONNECTICUT, ASSIGNOR OF ONE-HALF TO RANSOM L. BALDWIN, OF MERIDEN, CONNECTICUT.

VEHICLE-WHEEL.

No. 832,560.  Specification of Letters Patent.  Patented Oct. 2, 1906.

Application filed January 8, 1906. Serial No. 295,043.

*To all whom it may concern:*

Be it known that I, HERBERT S. PULLMAN, a citizen of the United States, and a resident of Meriden, in the county of New Haven and State of Connecticut, have invented a new and Improved Vehicle-Wheel, of which the following is a specification.

My invention relates more especially to that class of wheels provided with a cushion for absorbing the shocks and jars incident to the movement of a vehicle over a road; and the object of my invention is to provide a wheel of this class with a cushion that while serving every purpose in absorbing the shocks or jars shall at the same time be extremely durable in construction, sightly in appearance, and comparatively cheap in its manufacture and maintenance. One form of device in the use of which these objects may be attained is illustrated in the accompanying drawings, in which—

Figure 1 is a view in elevation of a wheel embodying my improvement with parts broken away to show construction. Fig. 2 is a view in cross-section through the rim on the line of the axis of the pin supporting the radially-disposed roller. Fig. 3 is a like view on a line through the spring-cups. Fig. 4 is a detail view, in cross-section, through the rim of the wheel on line of the axis of the rollers extending between the flanges of the outer rim.

In the accompanying drawings the numeral 1 denotes the hub of the wheel, provided with spokes 2, constructed after any usual form and arranged in any desired manner.

The numeral 3 denotes the inner rim, supported on the spokes and secured thereto by any means. In the form shown the hub, spokes, and inner rim are all cast integral each with others.

The outer rim is formed separately from the inner rim and has a certain limited movement thereon. This outer rim 4 has flanges 5 extending inward from the periphery and on opposite sides thereof. The diameter across the opening inclosed by these flanges is slightly greater than the diameter of the inner rim. A series of spring-cups 6 is located at regular intervals about the outer rim 4 and between the flanges, and a second series of spring-cups 7 is arranged about the periphery of the inner rim 3. Two of these spring-cups, one from each set or series, form a pair for the reception of the ends of each of the springs 8, which are disposed at regular intervals about the periphery of the inner rim and which serve to support in a radial direction what may be termed the "inner wheel," consisting of the hub, spokes, and rim 3, hereinbefore described.

The opening in each of the spring-cups is preferably of a size to quite closely embrace the end of a spring, but without binding, and each of the inner series of cups is beveled, as at 9, on opposite sides at the bottom and on the sides in the direction of rotation of the wheel to provide for a free and easy action of the springs in their operation as a cushion to support the inner wheel and the weight to be carried thereby. The cups in each of the series are preferably located quite closely together in order to support each other in the direction of rotation of the wheel; but it is obvious that other means for supporting the cups or each cup may be employed, if desired. Each of the cups 6, in the outer series preferably, quite closely fits the space between the flanges 5.

Roller-supports 10 extend between the flanges 5, these supports being arranged in pairs disposed at equal intervals about the circumference of the outer rim. Any desired number of pairs of supports may be employed, four pairs having been found to produce good results. Rollers 11 are mounted upon these supports, the length of each roller being such as to extend from flange to flange, but without binding at the ends, so that the rollers may rotate freely. The supports are preferably secured, as by riveting the ends, and they also form a support for the flanges against lateral outward strains, and the rollers form supports for the flanges against excessive lateral inward strains.

The width of the inner rim is such as to allow it to pass freely into the space between the flanges 5, and roller-studs 12 are located at regular intervals about the periphery of the inner rim, a stud being provided for each pair of supports 10 and rollers 11. These studs may be secured to the inner rim in any desired manner. In the form shown they are secured by means of screw-threads and in position to project each between a pair of rollers 11. Rollers 13 are mounted on the studs. These rollers are of a diameter to so fit the space between the flanges 5 as to provide a nice rolling contact between the parts and yet firmly support the inner wheel against lateral movement independently of the outer rim. A space is left between the outer surface of the rollers 13 and rollers 11, as shown in the drawings, to allow the two rims a certain limited circumferential movement independently each of the other.

An envelop or casing 14 surrounds the rim as a whole, including the outer and inner rims, and this envelop or casing may have a thickened tread 15. This envelop may be secured in place in any desired manner, as by lacing about the spokes and inner surface of the inner rim.

It is obvious that the details of construction may be departed from to a greater or less extent without avoiding the invention, and I do not limit myself to the exact features of construction herein shown and described.

What I claim as my invention, and desire to secure by Letters Patent, is—

1. An outer rim having oppositely-disposed integral flanges, an inner rim less in diameter than the space bounded by said flanges, springs arranged between the outer and inner rims, supports extending in pairs between said flanges, and studs extending from the inner rim into the space between the flanges and between the pairs of supports.

2. An inner rim, an outer rim having oppositely-disposed integral flanges, roller-supports extending between the flanges, rollers mounted on the supports, spring-cups appurtenant to each rim, springs with their ends located in said cups for supporting the thrust of one rim upon the other, studs secured to the inner rim, and rollers secured upon said studs and fitting the space between the flanges and projecting between the horizontally-disposed rollers.

3. An outer rim having oppositely-disposed integral flanges, an inner rim less in diameter than the space bounded by said flanges, springs arranged between the outer and inner rims, supports extending in pairs between said flanges, and studs extending through the inner rim and secured thereto by interengaging screw-threaded surfaces and projecting into the space between the flanges and between the pairs of supports.

4. An inner rim, an outer rim having oppositely-disposed integral flanges, roller-supports extending between the flanges, rollers mounted on the supports, spring-cups appurtenant to each rim, springs with their ends located in said cups for supporting the thrust of one rim upon the other, studs passed through the inner rim and secured therein by interengaging screw-threads, and rollers secured upon said studs and fitting the space between the flanges and projecting between the horizontally-disposed rollers.

HERBERT S. PULLMAN.

Witnesses:
EDWIN C. DICKENSON,
LENA E. BERKOVITCH.